(No Model.) 2 Sheets—Sheet 1.
W. N. CASON.
CHURN.
No. 493,681. Patented Mar. 21, 1893.
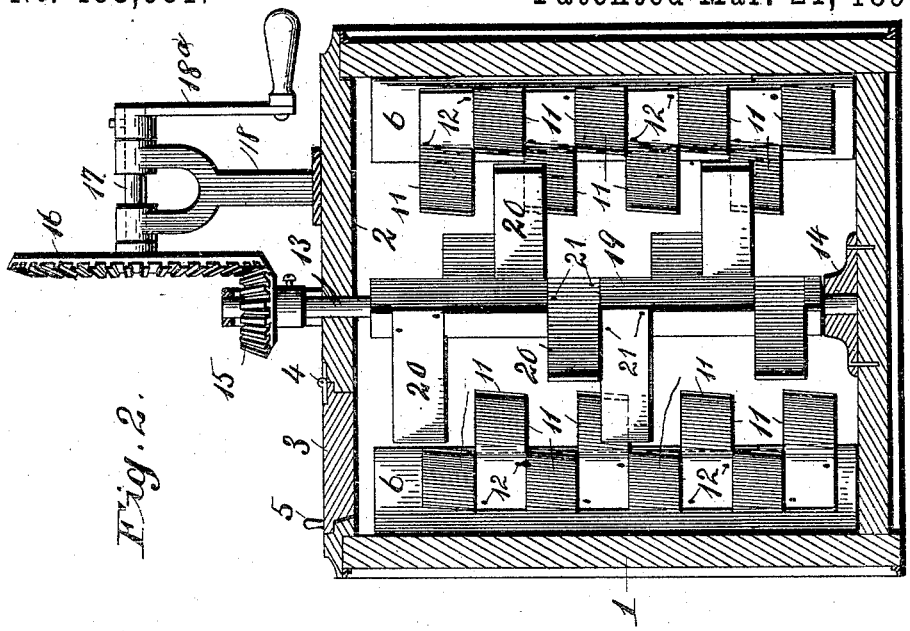
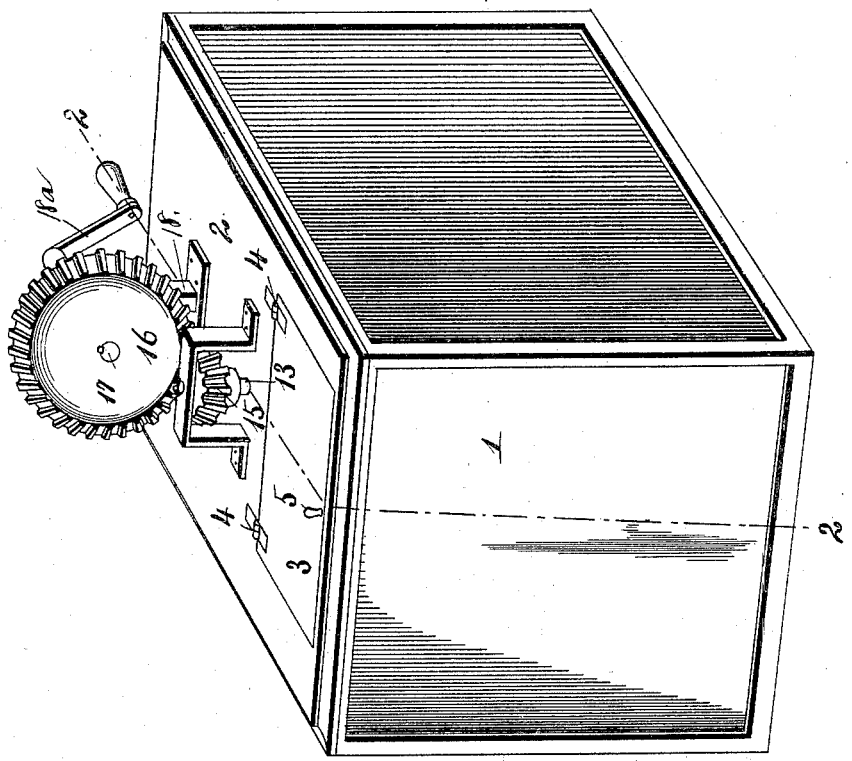
Witnesses:
F. G. Fischer
Jno. L. Condron
Inventor
Wm. N. Cason,
By Higdon and Higdon
Attys.

(No Model.) 2 Sheets—Sheet 2.
W. N. CASON.
CHURN.
No. 493,681. Patented Mar. 21, 1893.
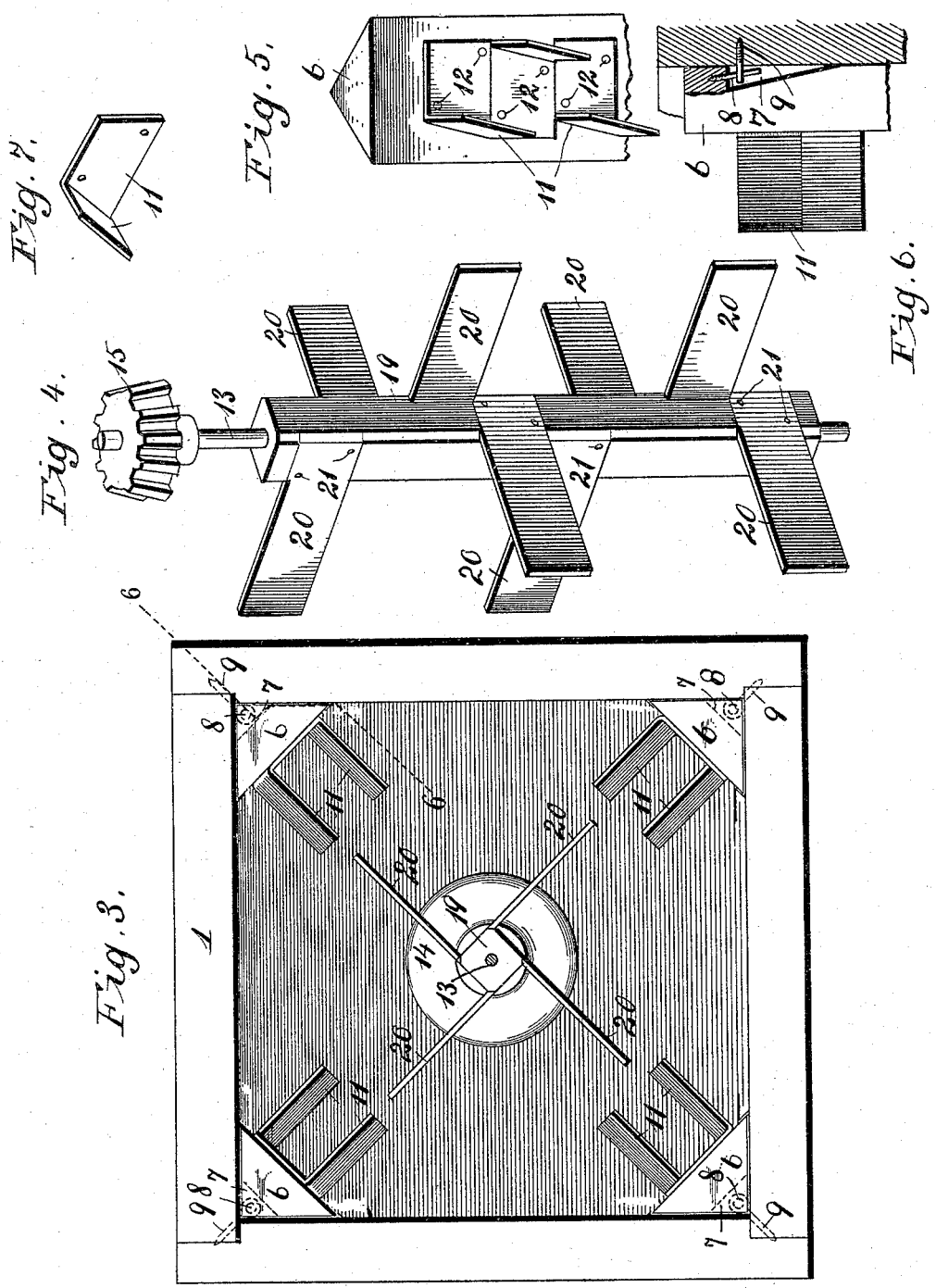
Witnesses:
F. G. Fischer,
Jns. L. Condron
Inventor
Wm. N. Cason,
By Higdon and Higdon
Attys.

UNITED STATES PATENT OFFICE.

WILLIAM N. CASON, OF KANSAS CITY, MISSOURI.

CHURN.

SPECIFICATION forming part of Letters Patent No. 493,681, dated March 21, 1893.

Application filed August 1, 1892. Serial No. 441,897. (No model.)

*To all whom it may concern:*

Be it known that I, WILLIAM N. CASON, of Kansas City, Jackson county, Missouri, have invented certain new and useful Improvements in Churns, of which the following is a full, clear, and exact description, reference being had to the accompanying drawings, forming a part hereof.

My invention relates to machines for producing butter from cream, and the objects of my invention are to produce a churn which shall be simple, strong, durable and inexpensive in construction, and very rapid and effective in its operation, and the principal operative parts of which shall be so constructed and arranged as to be readily removable from the body of the churn for the purpose of cleaning, repairing and the like.

A further object of my invention is to produce a churn the dashers of which shall operate revolubly and shall cause the cream to come into contact with the opposing stationary arms whereby the cream shall be thoroughly agitated and its fatty globules rapidly broken up; thereby separating the butter from the cream with great rapidity and in the most effective manner.

To the above purposes my invention consists in certain new and peculiar features of construction and arrangement, as hereinafter described.

In order that my invention may be fully understood, I will proceed to describe it with reference to the accompanying drawings, in which:

Figure 1 is a perspective view of a churn embodying my invention. Fig. 2 is a transverse vertical section of the same on the line 2—2 of Fig. 1. Fig. 3 is a top or plan view of the same; the top of the churn body being removed and the operating gearing of the churn dashers being also removed. Fig. 4 is a detached perspective view of the churn dasher and the beveled gear-wheel pinion of the same.
Fig. 5 is a detached perspective view of the upper portion of one of the removable stationary-arm carriers. Fig. 6 is a transverse vertical section of the same on the line 6—6 of Fig. 3. Fig. 7 is a detached perspective view of one of the stationary agitator-arms.

In the said drawings, 1 designates the body of the churn this body being preferably of rectangular or cubical form as shown and being constructed preferably of wood. 2 designates the top of the churn, this being of such dimensions as to completely close the upper part of the churn body and being preferably mounted removably thereon as is most clearly shown in Fig. 2. This top 2 is provided with a lid 3 which is located at the front portion of the top and which is connected to said top by any suitable or preferred number of hinges 4; these hinges being also of any suitable or preferred type. The lid 3 closes the corresponding opening in the front part of the top 2 and is preferably provided on its upper side with an upwardly extending knob or handle to facilitate the opening and closing of the lid.

In each corner of the churn body 1, is located removably a vertical standard 6 which is of triangular form in cross section so as to fit closely into the corner, and which is preferably of such length as to extend from the bottom of the body 1 upward nearly to the top 2 of the churn. At the upper part of its rear angle, each of these vertical standards is formed with an inwardly extending notch or recess 7 into the top of which is driven a pendent pin 8, as is most clearly shown in Fig.
6. Each of these pins 8 passes into an eye which is formed on the inner end of a ring-screw 9; these screws being inserted into the upper part of the angles of the churn body. It will thus be seen that when it is desired to remove the standards 6, said standards can be readily lifted upward out of the body of the churn, the pins 8 passing easily out of the eyes of the screws 9 and that when the standards 6 are in position within the churn, the pins entering the eyes serve to secure the pins thus in their required positions.

Upon the inner side of each standard 6 are secured a number of stationary agitator-arms 11, each of which is preferably of metal and also of approximately L-form as shown. One arm of each of these stationary-arms extends horizontally across the inner side of the standard 6 and is secured thereto by screws 12, or in any other suitable manner and the opposite or outer arms of each of the agitator-arms extend horizontally inward toward the center of the churn body. These inwardly extending arms are preferably set somewhat obliquely to a vertical plane and the arms are alternately arranged so that one arm extends from near the opposite side of the standard 6 from that near which the next immediately succeeding arm extends.

13 designates the shaft of the churn-dashers; this shaft extending vertically through the center of the churn body and projecting upwardly through the top 2 of the churn body. The lower end of this shaft 13 is inserted into a step-bearing 14 which is screwed or bolted, or otherwise secured to the bottom of the churn body. At its upper end the shaft 13 carries a beveled gear-pinion 15, the teeth of which mesh with the teeth of the vertical beveled gear-wheel 16 as shown. This gear-wheel 16 is mounted upon one end of the horizontal shaft 17 which is journaled in the bifurcated upper end of the vertical yoke-standard 18; the lower end or foot of this yoke-standard being screwed or otherwise suitably secured to the top 2 of the churn. At the opposite end of the shaft 17 from that which carries the gear-wheel 16 is mounted a crank-arm and crank-handle $18^a$ and it will be seen that by turning the crank-handle $18^a$ rotary motion is imparted to the shaft 17 and to the gear-wheel 16 and consequently to the gear-pinion 15 and through the latter to the dasher-shaft 13. This dasher-shaft 13 extends longitudinally through a vertical post or carrier 19 which is of such length as to extend from the upper side of the step-bearing 14 vertically upward nearly to the top 2 of the churn. This post or carrier is shown as of quadrangular form in cross section and to each of the four sides of the post or standard are secured a number of horizontal radial dasher-arms or blades 20. These dasher-arms or blades are preferably of metal and are secured to the post or carrier 19 by suitable screws 21 or other equivalent means and said arms or blades are of such length as to extend outward toward the inner ends of the stationary agitator-arms 11 before described. The dasher-arms or blades 20 are alternately arranged relatively to each other as shown and it is to be understood that while the post or standard 19 is above described as of quadrangular form and is consequently shown as having but four sides, said standard 19 may be polyangular and there may be as many sections of blades or arms 20 as there are sides to the post or carrier 19.

The operation of the churn will be clearly understood from the above description and drawings; the revolution of the shaft 17 and the dasher-shaft 13 above described carrying the dasher-arms or blades 20 to pass the inner ends of the stationary agitator-arms 11, dashing the cream forcibly against said arms and thus thoroughly agitating the cream and rapidly breaking up the fatty globules and quickly producing butter from the cream.

It will be readily understood that whenever desired—for the purpose of cleaning, repairing, or the like, the dasher-shaft 13 with its dasher blades or arms 20 and the standards 6 with their dasher arms 11 can be quickly removed from the churn and readily replaced whenever desired.

Having thus described my invention, what I claim as new therein, and desire to secure by Letters Patent, is—

In a churn, the combination of an angular body-portion and a vertical revoluble dasher-shaft having a vertical angular body-portion, and provided with alternate horizontal outwardly extending dasher-arms or blades secured to the sides of the angular body-portion of the dasher-shaft, with a number of removable standards, tri-angular in cross-section and located in the corners of the churn-body, and each provided with two vertically arranged series of dasher arms, secured to the inner side of the said standards, and projecting inwardly toward the center of the churn, substantially as described.

In testimony whereof I affix my signature in the presence of two witnesses.

WILLIAM N. CASON.

Witnesses:
 JNO. L. CONDRON,
 JOE M. CASON.